United States Patent
Nagendra et al.

(10) Patent No.: US 11,709,801 B2
(45) Date of Patent: Jul. 25, 2023

(54) FILE-BASED SHARING USING CONTENT DISTRIBUTIONS NETWORK

(71) Applicant: SAP SE, Walldorf (DE)

(72) Inventors: Abhishek Nagendra, Bangalore (IN); Subhadeep Khan, Anandapur (IN); Harikrishnan Mangayil, Bangalore (IN)

(73) Assignee: SAP SE, Walldorf (DE)

( * ) Notice: Subject to any disclaimer, the term of this patent is extended or adjusted under 35 U.S.C. 154(b) by 462 days.

(21) Appl. No.: 16/883,754

(22) Filed: May 26, 2020

(65) Prior Publication Data

US 2021/0318989 A1    Oct. 14, 2021

(30) Foreign Application Priority Data

Apr. 8, 2020 (IN) .............................. 202011015393

(51) Int. Cl.
*G06F 16/178* (2019.01)
*G06F 16/176* (2019.01)
(Continued)

(52) U.S. Cl.
CPC .......... *G06F 16/178* (2019.01); *G06F 16/176* (2019.01); *G06F 21/6218* (2013.01); *H04L 67/1095* (2013.01); *H04L 67/1097* (2013.01)

(58) Field of Classification Search
CPC .. G06F 16/178; G06F 16/176; G06F 21/6218; G06F 16/9574; G06F 21/645;
(Continued)

(56) References Cited

U.S. PATENT DOCUMENTS 10,212,166 B2 * 2/2019 Xie ........................ G06F 21/33
2007/0033191 A1 * 2/2007 Hornkvist ............... G06F 16/14
707/999.009
(Continued)

OTHER PUBLICATIONS

U.S. Patent Application entitled "Analytics Content Network For Content Delivery Embedding", filed Dec. 19, 2019, 49 pages.
(Continued)

*Primary Examiner* — Abdullahi E Salad
(74) *Attorney, Agent, or Firm* — Fountainhead Law Group P.C.

(57) ABSTRACT

Embodiments relate to file-based sharing of content through a content distribution network. A request is received from a source to disseminate content to a target consumer. The request does not include target consumer URL information. Based upon the request, content metadata stored in a database with content data, is referenced to generate a file including metadata comprising a portion of the content metadata. The file does not include the content data. The file is exported to the source. The source delivers the file to the target consumer through a communication channel (e.g., shared folder, email) located outside of the distribution network. The file is imported from the target consumer. The metadata of the file is processed to examine its integrity. The metadata may comprise a key for reference during this process. Upon confirming integrity of the file, the content data and the content metadata are distributed to the target consumer.

20 Claims, 7 Drawing Sheets

(51) Int. Cl.
*G06F 21/62* (2013.01)
*H04L 29/08* (2006.01)
*H04L 67/1097* (2022.01)
*H04L 67/1095* (2022.01)

(58) Field of Classification Search
CPC .. H04L 67/1095; H04L 67/1097; H04L 67/06
See application file for complete search history.

(56) References Cited

U.S. PATENT DOCUMENTS

| | | | |
|---|---|---|---|
| 2016/0129627 A1* | 5/2016 | Fuchs | B29C 66/301 |
| | | | 156/538 |
| 2017/0004323 A1* | 1/2017 | Balachandran | G06F 21/6209 |
| 2018/0046678 A1* | 2/2018 | Wilding | G06F 11/3452 |
| 2018/0074873 A1* | 3/2018 | Iqbal | G06F 11/1469 |
| 2021/0112059 A1* | 4/2021 | Heldman | H04L 67/10 |

OTHER PUBLICATIONS

U.S. Patent Application entitled "Assigning Access Control for Flat Data Structure" U.S. Appl. No. 16/867,304, filed May 5, 2020, 50 pages.

\* cited by examiner

FILE-BASED SHARING USING CONTENT DISTRIBUTIONS NETWORK

CROSS-REFERENCE TO RELATED APPLICATION

The instant US Nonprovisional Patent Applications claims priority to Indian Provisional Patent Application No. 202011015393, filed Apr. 8, 2020 and incorporated by reference in its entirety herein for all purposes.

BACKGROUND

Unless otherwise indicated herein, the approaches described in this section are not prior art to the claims in this application and are not admitted to be prior art by inclusion in this section.

Software systems permit enterprises to generate and accumulate volumes of data such as product data, financial data, human resources (HR) data, and the like. To aid the enterprise in gleaning meaningful insights from the mass of data, intelligent analytics systems have been developed. These analytics systems afford insights—statistics, facts, trends, and the like determined from the enterprise data. Example insights include, e.g., highest rated product, revenue, margin, actual sales, forecast sales, and the like. Specific types of analytic content can comprise dashboards, Key Performance Indicator (KPI) definitions, and planning scenarios.

Various entities can generate analytic content. For example, a service provider may provide the analytics system. Other entities that generate analytic content can include but are not limited to third-party developers, and OEMs. A service provider offering the analytics system can provide one or more dashboards as analytics content, which a customer using the analytics system access enterprise data and insights. Thus, best-of-breed analytics content can be provided, and each customer is not required to create their own analytics content.

A distribution network can be used to communicate content from the analytics system to various consumers, such as individual customers and tenants. Some such content distribution networks may rely upon the disclosure of Uniform Resource Locator (URL) information for the dissemination of information to consumers.

SUMMARY

Embodiments relate to file-based sharing of content through a content distribution network. A request is received from a source (e.g., one tenant of a customer landscape) to disseminate content to a target consumer (e.g., another tenant of the customer landscape). The request does not include URL information of the target consumer. Based upon the request, content metadata stored in a database with content data, is referenced to generate a file including metadata comprising a portion of the content metadata. The file does not include the content data. The file is exported to the source. The source delivers the file to the target consumer through a communication channel (e.g., shared folder, email, text, other) located outside of the distribution network. The file is imported from the target consumer. The metadata of the file is processed to examine an integrity of the file. Upon determining the integrity of the file, the content data and the content metadata are distributed to the target consumer. Where the content data is organized according to packages, the metadata of the file may comprise a package identifier. Where the target consumer is resident within a landscape, the metadata of the file may comprise an identifier of that landscape. The metadata may comprise a key for reference in confirming integrity of the imported file.

The following detailed description and accompanying drawings provide a better understanding of the nature and advantages of various embodiments.

DETAILED DESCRIPTION

Described herein are methods and apparatuses that implement file-based sharing utilizing a content distribution network. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
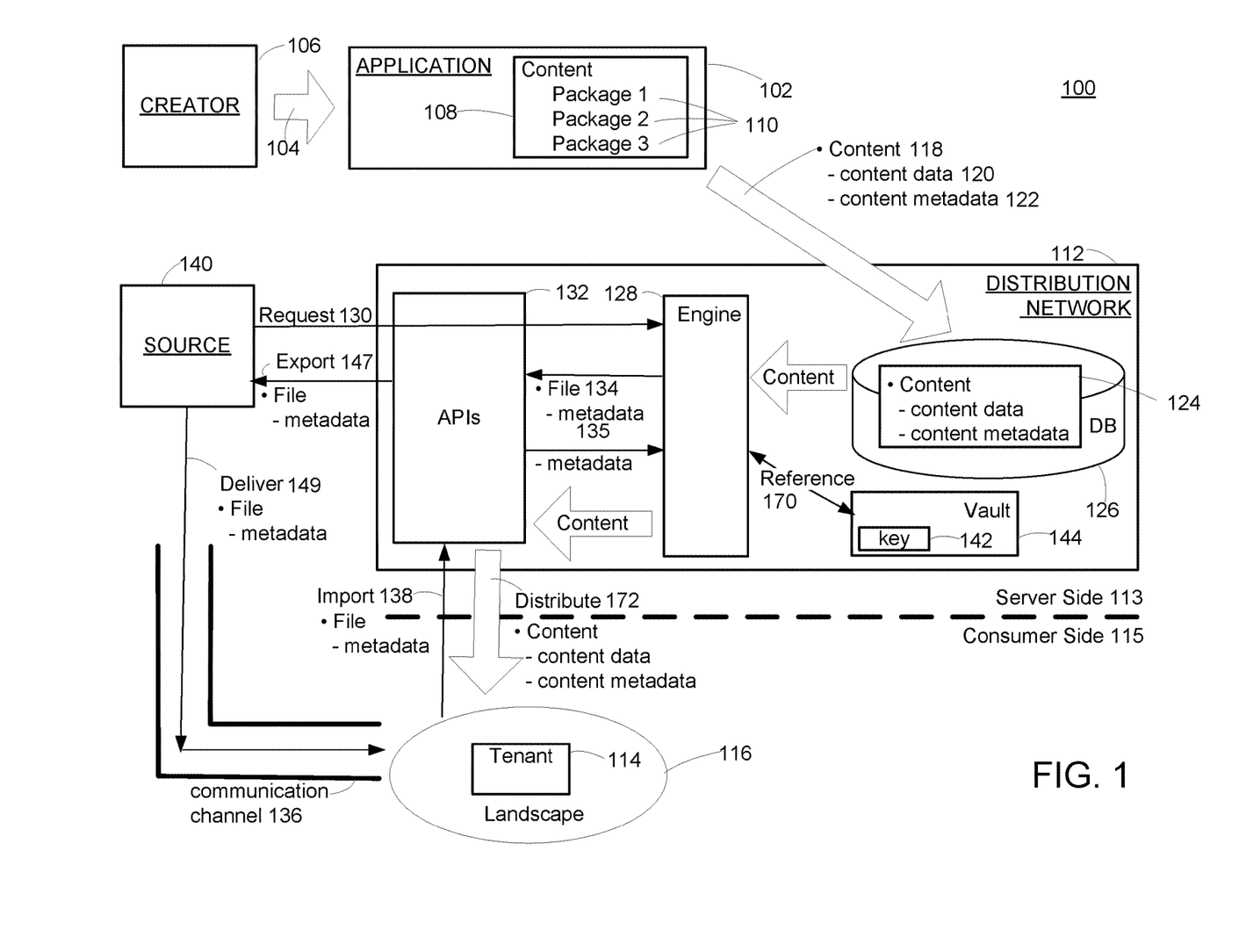
FIG. 1 shows a simplified diagram of a system according to an embodiment.

FIG. 1 shows a simplified view of an example system that is configured to implement file-based content sharing according to an embodiment. Specifically, system 100 comprises an application 102 that is configured to receive input 104 from a creator 106.

Based upon that input, the application creates corresponding content 108. As shown in FIG. 1, that content may comprise packages 110. Examples of content packages can include but are not limited to: dimensions, stories, views, key performance indicators (KPIs), and others.

The application is in communication with a distribution network 112 that is located on a server side 113. The role of the distribution network is to securely disseminate content to consumers who are located on a consumer side 115. Examples of such consumers can be tenants 114 that reside within a landscape 116, for example a specific tenant of a particular customer landscape and/or a particular data center landscape.

The distribution network may be able to convey content to individual consumers in a variety of ways. However, embodiments as described herein focus upon the distribution of content utilizing a file-based mechanism.

Specifically, content 118 comprising data 120 and content metadata 122 is received by the distribution network from the application 102. An example of content metadata 122 could be an identifier of the package of the content. Another example of content metadata 122 could identify a specific tenant and/or landscape to which the content is relevant.

The content data 120 and associated content metadata 122 is stored within database 126. In an example, the content data and metadata is stored within a data structure 124 such as a database table.

The distribution network further comprises an engine 128. The engine is configured to receive a request 130 from the user to distribute the data and metadata of the content to a specific consumer such as the tenant. Depending upon the particular embodiment, this request may be conveyed to the engine via an Application Program Interface (API) 132.

The user is an entity knowledgeable regarding the content, and who seeks to share it with the target consumer without disclosing URL information. In some embodiments the user may be a specific customer or a tenant thereof. In the latter case, embodiments envision the secure sharing of content between tenants without disclosure of tenant URL information.

In response to this request, the engine is configured to generate a file 134 that includes metadata 135, but not actual data from the content. This metadata can include a portion of the content metadata, for example a package Id and/or a landscape Id.

The metadata may further include other components. One example of such another component of the file metadata can comprise information ensuring an integrity of the file and its contents.

In a specific example, the metadata may include a key 142, e.g., as stored in a vault 144. Further details regarding the structure of the file are described later below in connection with the example.

Having generated the file including the metadata, the engine exports 147 the file to the user. This communication of the file to the user, may occur via the API.

Next, the recipient of the exported file is responsible for delivering 149 that file to the consumer (e.g., the tenant 114), via a communication channel 136. This communication channel is separate and distinct from the distribution network. Examples of the communication channel could include but are not limited to: shared folder, email, text, physical delivery (e.g., via dongle), or some other alternative mechanism.

Having received the file and its metadata delivered via the communication channel, the consumer is now able to access the content from the distribution network in a secure manner. In particular, the file is imported 138 to the distribution network via the API.

The engine receives the file including the metadata. Based upon processing of the metadata portion to examine the integrity of the file, the engine distributes 172 the relevant content data and content metadata to the consumer via the API of the distribution network. This processing may involve referencing 170 the key stored in the vault. Specific examples of processing to distribute the content to the target consumer, are further described below in connection with the example.

Figure 1A:
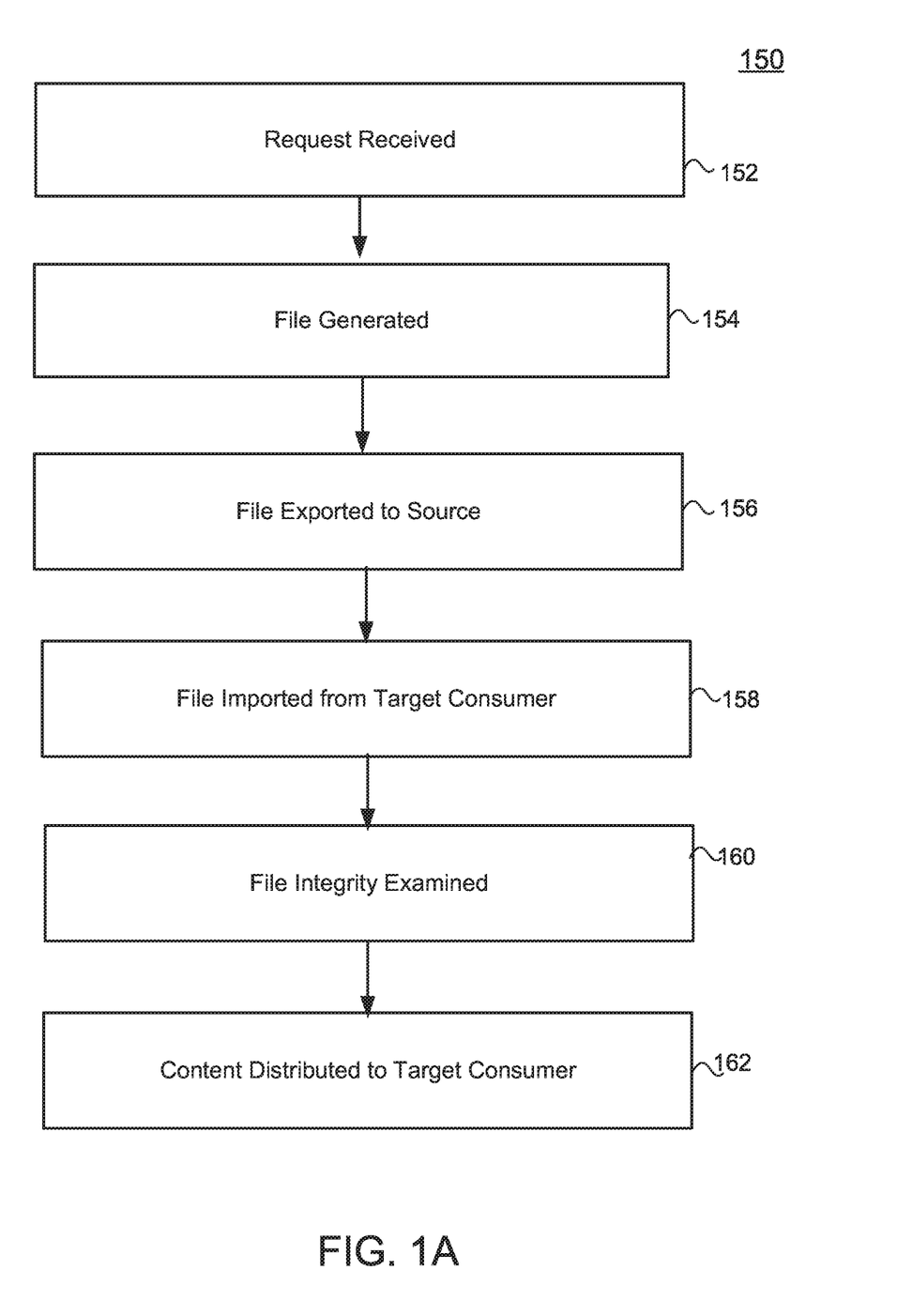
FIG. 1A shows a simplified flow diagram of a method according to an example.

FIG. 1A is a simplified flow diagram of a method 150 according to an embodiment. At 152, a request to distribute content stored in a database of a distribution network, is received from a source 140.

At 154, based upon the request, content metadata stored in the database are referenced to generate a file including metadata. At 156, the file is exported to the source 140 for ultimate delivery to the target consumer via a separate communications channel.

At 158, the file is imported from the target consumer. At 160, the engine processes the file to examine its integrity based upon the metadata.

At 162, upon determining the integrity of the file, the content data and content metadata are distributed to the target consumer.

Further details regarding file-based sharing utilizing a content distribution network according to embodiments, are now provided in connection with the following example.

EXAMPLE

The SAP Analytics Cloud (SAC) is an analytical tool available from SAP SE of Walldorf, Germany. SAC encompasses planning, business intelligence, and predictive capabilities.

Analytical content created may need to be shared across to other tenants belonging to a same partner, customer, or to the partners' customer. Such sharing is achieved utilizing the Analytics Content Network (ACN) feature of SAC.

Traditionally, a file-based approach may be implemented to provide analytics content to consumers. Under a file-based approach, analytics content is down- and up-loaded to files (e.g., .tgz files (GZIP Compressed Tar Archive files)). However, analytics content has to be provisioned to tenants (e.g., executing an application, in which the analytics content is to be provided). If the analytics content is developed and owned by the service provider (here SAP SE) or by third-parties (e.g., partners of the enterprise), the analytics content has to be shipped together with the SAC application and has to be installed at the point in time when the tenants are upgraded to a respective release of the application.

In order to impart flexibility for content distribution, SAC further includes the ACN feature. In particular, ACN is one of SAC's important infrastructure components. ACN resides in SAC landscapes as a central component, connecting those landscapes.

Logically, ACN can be understood as a single global content network which can provision or share any SAC content. As ACN is connected out-of-the-box to any SAC tenant, it can provision and share content into any SAC tenant.

Thus, with the provision of the ACN, SAC has evolved from a pure file-based approach where content could be down- and uploaded to tgz files, to now also supporting content import/export to and from SAC Cloud resources. This ACN infrastructure appears as the "Content Library" in the SAC UI.

ACN supports at least the following end-user workflows:
1. An SAC content creator creates SAC content in the form of stories, models, dimensions, connections, Value-Driver Trees (VDT) etc.—all in all >20 content types. If authorized, (s)he can then export this content from the SAC tenant to ACN by creating a "content package" which can contain any number of these content items and share this with multiple other tenants.
2. A SAC content user can view all available content packages in their listing and import those packages relevant for their analytic workflows. This includes Public content (Templates or Demo content) and Private Content (shared privately with them).

Moreover, the embedded LoB scenario that is available according to embodiments as described herein, allows for a third end-user workflow.
3. A SAC content creator can export to ACN as "Private Content", and then download a file representing the exported content. The file can now be shared with a SAC content user through any type of communication channel (e.g., email, shared folder, text, others). The SAC content user would specify this file to the ACN, and then be able to import the content on the target tenant.

A server system can host one or more cloud-based systems (e.g., SAP Analytics Cloud, SAP Analytics Hub). In some implementations, a cloud-based system further includes an ACN that is used to provision analytics content to one or more applications.

For example, a customer (e.g., an enterprise) can use an application (e.g., SAP SuccessFactors) in a tenant-based scenario, which includes provisioning of the application for a customer within an application tenant that is specific to the customer. Further, and in accordance with particular embodiments, the application can include an analytics system (e.g., SAC) embedded therein. For example, the analytics system can be provided in an analytics system tenant that is embedded in the application tenant.

As introduced above, specific embodiments are directed to an ACN that permits distribution of analytics content for applications having an analytics system embedded therein. More particularly and as described in further detail herein, analytics content is provisioned from the ACN for use with analytics functionality provided by an analytics system that is embedded within an application.

That is, for example, the ACN supports import and export of analytics content to and from resources (e.g., cloud-based resources). For example, the analytics system providing analytics functionality within an application can include a UI (e.g., a "Content Library" UI) that allows a user (e.g., an agent of a customer) to access analytics content from the ACN.

Figure 2:
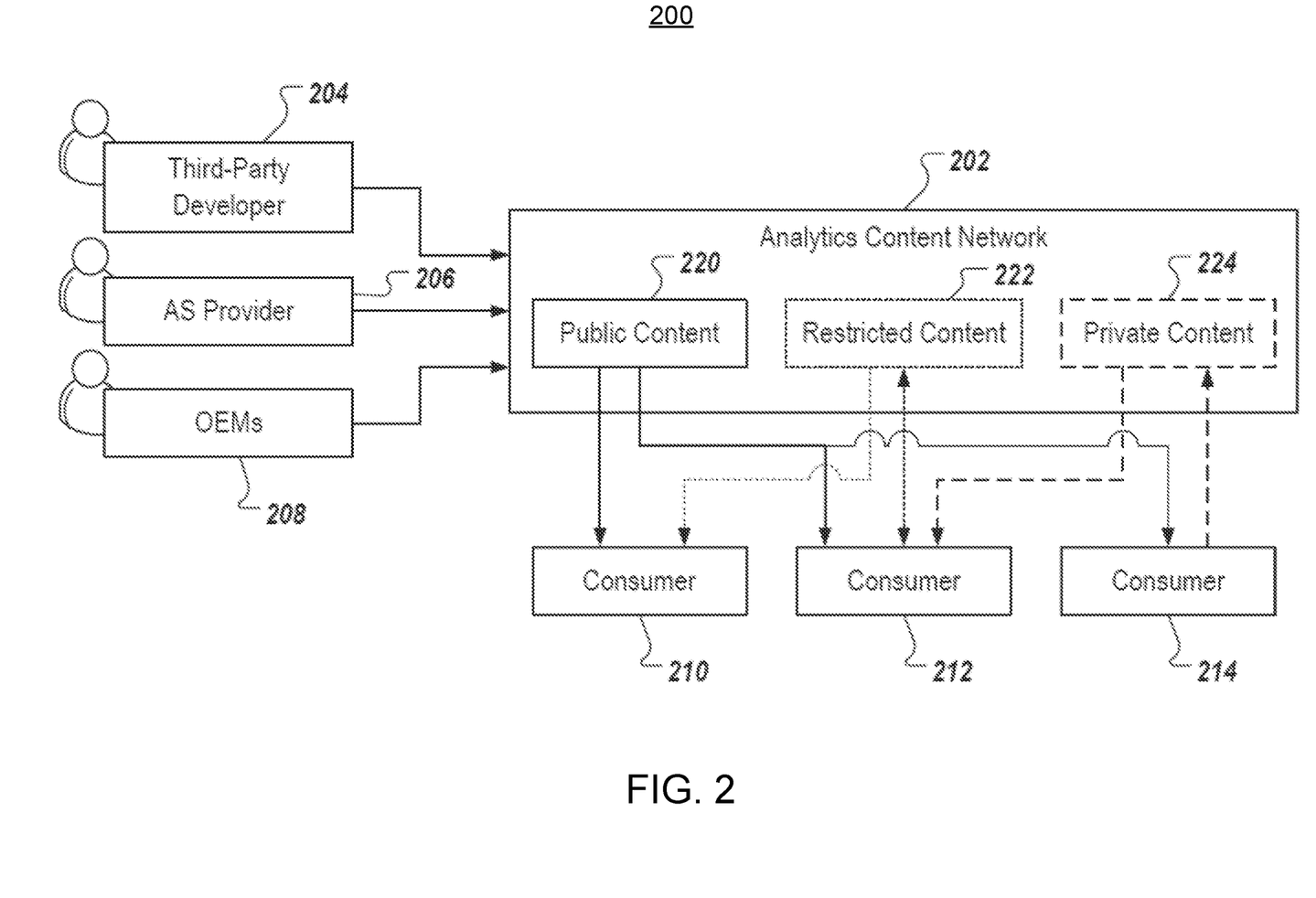
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes an ACN 202, analytics content creators 204, 206, 208, and analytics content consumers 210, 212, 214. The ACN 202 includes a public analytics content store 220, a restricted analytics content store 222, and a private analytics content store 224. In some examples, one or more of the analytics content creators 204, 206, 208 provide analytics content that is published to the ACN 202. Example analytics content sources can include, without limitation, a third-party developer (analytics content source 204), an analytics system provider (analytics content source 206) (e.g., SAP SE, which provides SAC), and an OEM (analytics content source 208). In some examples, an OEM can include an enterprise that provides an application, within which the analytics system is embedded. For example, an OEM can include SAP SE, which provides SAP SuccessFactors, within which SAC can be embedded. In some examples, another OEM can provide their own proprietary application, within which SAC can be embedded.

In general, the analytics content creators create one or more types of analytics content. Example analytic content can include, without limitation, stories, models, dimensions, connections, Value-Driver Trees (VDT), dashboards, KPI definitions, and planning scenarios. If authorized, a content creator can export their analytics content to the ACN 202 by creating a content package, which contains one or more items of analytics content. In some examples, content is created using an analytics system tenant and is exported to the ACN 202. For a pre-defined content scenario (e.g., content provided by the AS provider 206), content is created using an internal analytics system tenant, is exported to the ACN 202, and is available to all analytics system tenants. In some examples, an analytics content administrator can view all available content packages. If authorized, one or more content packages can be imported from the ACN into one or more analytics system tenants. Thus, the analytics content is available for use in the respective analytics system tenants.

Example use cases for analytics content can include template content, demo content, and so-called "out-of-the-box" usable content. In some examples, template content includes analytics content that can be populated (e.g., with enterprise data, visualizations, analytical data), and can be modified by users. In some examples, demo content can be described as a lighter variant of template content, which typically comes with demo data (e.g., demo enterprise data) in the content package. In this manner, the analytics content can be demoed within the analytics system tenant immediately using the demo data, but is not usable in a production scenario. In this manner, a user can test the analytics content before importing a production-usable version of the analytics content. In some examples, the "out-of-the-box" usable analytics content is delivered together with applications which "fit" to the analytical content, and which keep its data actual.

In further detail, creation of analytics content can be described as a development task. For example, a developer (e.g., computer programmer) develops the analytics content in computer-executable code. For example, a dashboard is programmatically defined and is stored in one or more files (e.g., content packages). When ready for consumption (e.g., after final review, testing) the analytics content is exported to the ACN 202 (e.g., the developer manually exports content packages).

In some implementations, the analytics content consumers 210, 212, 214 represent one or more enterprises (customers) that consume applications and analytics systems provided by the service provider 206 (e.g., SAP SE). In some examples, the analytics content consumers 210, 212, 214 each represent one or more application tenants each embedded with an analytics system tenant, as described herein. In accordance with implementations of the present disclosure, each of the analytics content consumers 210, 212, 214 receives analytics content from the ACN 202. For example, the analytics system tenant of each of the analytics content consumers 210, 212, 214 receives analytics content from the ACN 202. Although not depicted in FIG. 2, but as described in further detail herein, the analytics content is received from the ACN 202 through one or more application programming interfaces (APIs).

In the particular example shown in FIG. 2, each of the analytics content consumers 210, 212, 214 receives the public analytics content from the public analytics content store 220. For example, the public analytics content can include a dashboard provided by the service provider (e.g., SAP SE), the dashboard being made available to all consumers of an application (e.g., SAP SuccessFactors) having analytics embedded therein. In some examples, the public analytics content is provided on a pull basis. That is, for example, to receive the public analytics content, a consumer sends a call for the public analytics content to the ACN 202 (e.g., through an API).

In the example of FIG. 2, the consumer 212 receives private analytics content from the private analytics content store 224 and the consumer 214 provides private analytics content to the private analytics content store 224. In some examples, each consumer can create their own analytics content as private analytics content, and can transport the private analytics content from one of their analytics system tenants to another one of their analytics system tenants. In the example of FIG. 2, the consumer 214 can be a first analytics system tenant of an enterprise and the consumer 212 can be a second analytics system tenant of the enterprise, the consumer 214 transporting private analytics content to the consumer 212 through the ACN 202.

In the example of FIG. 2, the consumer 212 receives private analytics content from the private analytics content store 224 and the consumer 214 provides private analytics content to the private analytics content store 222. In some examples, each consumer can create their own analytics content as private analytics content, and can transport the private analytics content from one of their analytics system tenants to another one of their analytics system tenants. In the example of FIG. 2, the consumer 214 can be a first analytics system tenant of an enterprise and the consumer 212 can be a second analytics system tenant of the enterprise, the consumer 214 transporting private analytics content to the consumer 212 through the ACN 202.

Figure 3:
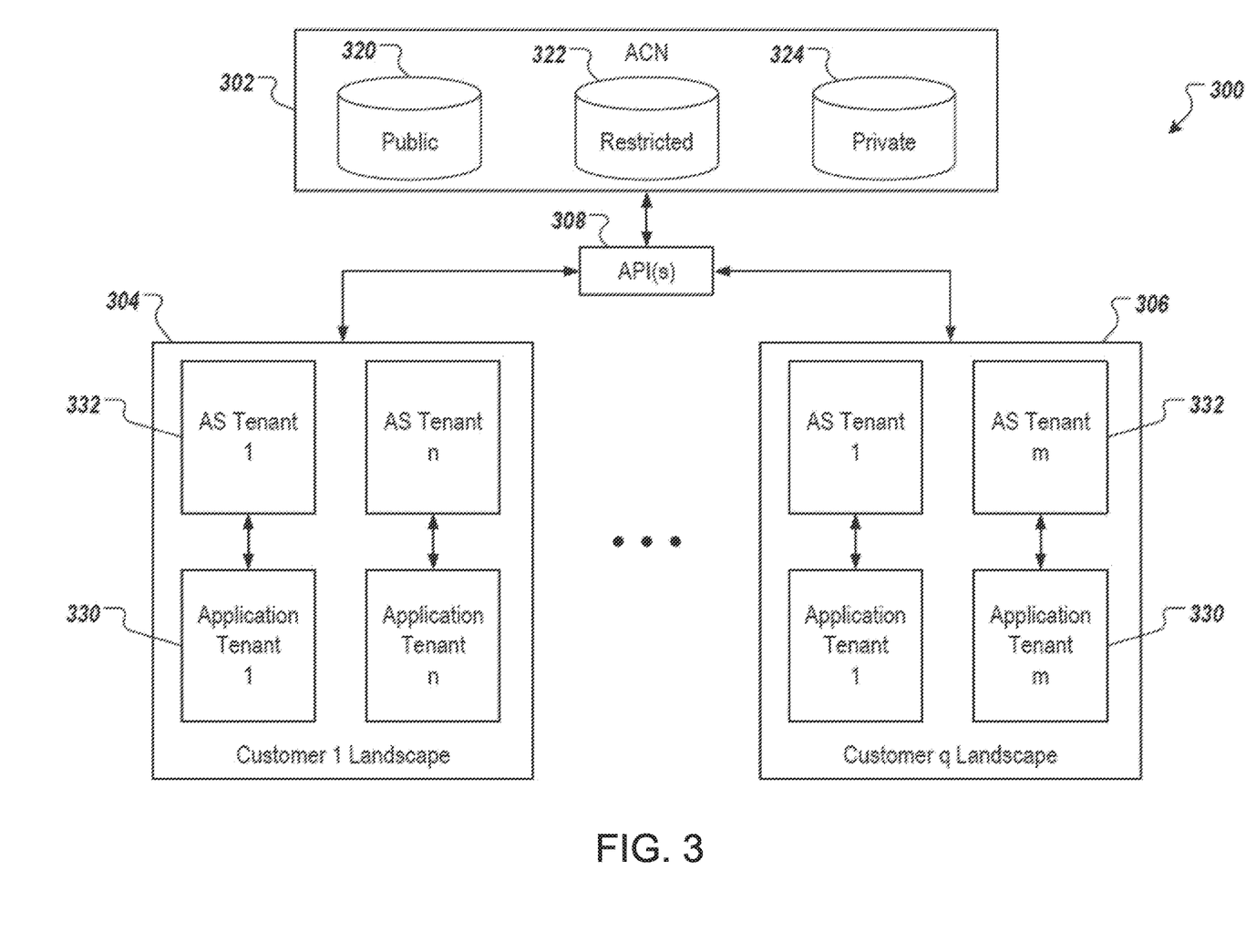
FIG. 3 depicts an example architecture in accordance with implementations of the present disclosure.

FIG. 3 depicts an example architecture 300. Here, the example architecture 300 includes an ACN 302, customer landscapes 304, 306, and one or more APIs 308 (e.g., REST APIs), through which the ACN 302 communicates with each of the customer landscapes 304, 306. In the depicted example, each of the customer landscapes 304, 306 includes one or more applications tenants 330 and respective analytics system tenants 332. In accordance with implementations of the present disclosure, and as described herein, each application tenant 330 is embedded with a respective analytics system tenant 332, which receives analytics content from the ACN 302. The ACN 302 includes a public analytics content store 320, a restricted analytics content store 322, and a private analytics content store 324, as similarly described above with reference to FIG. 2.

In accordance with implementations of the present disclosure, delivery of analytics content from the ACN 302 to one or more of the analytics system tenants 332 is automatically executed. For example, at provisioning of an analytics system tenant 332, analytics content that is relevant to the particular analytics system tenant 332 and/or customer is provided from the ACN 302. Automated provisioning of the analytics content enables time- and resource-efficient distribution of the analytics content, particularly in the case of 10s, 100s, or 1000s of tenants. In some examples, different tenants receive different analytics content. For example, an application tenant 330 of the customer landscape 304 can execute a first application (e.g., SAP SuccessFactors) that is embedded with the analytics system through the analytics system tenant 332 and receives first analytics content that is relevant to the first application (e.g., a HR dashboard for displaying analytical data, such as, recruitment KPI values, requisitions, positions, recruitment process analysis, and talent pipeline). As another example, an application tenant 330 of the customer landscape 306 can execute a second application (e.g., SAP CRM) that is embedded with the analytics system through the analytics system tenant 332, and receives second analytics content that is relevant to the second application (e.g., a CRM dashboard displaying analytical data, such as, growth, pipeline, sales team performance, target planning, and quota planning) In some examples, the analytics content that is to be sent to an analytics system tenant can be determined based on a universally unique identifier (UUID) that uniquely identifies the analytics system tenant among multiple analytics system tenants.

In some implementations, multiple types of analytics content delivery into tenants are provided, and can range from simple to advanced. Example types include, without limitation, manual analytics content delivery, automated-simple analytics content delivery (also referred to herein as light-embedding), and automated-advanced analytics content delivery (also referred to herein as deep-embedding).

In some examples, manual analytics content delivery refers to scenarios, in which a user (e.g., an agent/employee of a customer) of an application manually requests analytics content. For example, the user can open a content library using a UI of the application and can select one or more content packages. In response, a request is submitted to the ACN 302 through the API(s) 308 to import the analytics content and use the analytics content within the application. The manual analytics content delivery is typically used in case where an application has few tenants.

In some examples, in light-embedding, content packages are deployed through a tenant configuration API (TC-API), which is provided as one of the APIs 308. In some examples, the TC-API provides for tenant configuration. For example, upon initiation of an analytics system tenant, a call can be made through the TC-API for a configuration file that is used to configure the analytics system tenant:
(e.g., https://api.analytics.system/oem1ltenant/<AS_tenant uuid>/config).

For example, the call identifies a particular tenant using a UUID assigned to the tenant and requests computer-executable configuration instructions (config). In some examples, one of the configurations is "ACN content import" (e.g., "SetAcnPackage" in the API payload). In some examples, the particular analytics content can be determined based on the UUID of the tenant. For example, the UUID can be mapped to one or more analytics content, which is then provided in a content package to be included in the API payload sent in response to the configuration request. In this manner, the content package (containing the analytics content that is to be delivered to the analytics system tenant) is provided in the API payload that is transmitted to the analytics system tenant.

In some examples, authentication is provided using API keys. For example, each analytics system tenant includes an API key that is provided with the API call and authenticates the analytics system tenant for receipt of the content package(s). The API key can include an encrypted value that the API can use to authenticate the source of the API call (i.e., the tenant).

In some examples, in deep-embedding, content packages are deployed through a set of analytics system tenant content import/export APIs, which are provided in the APIs 308. In some examples, deep-embedding is used in scenarios where content packages are managed by respective development teams. For example, for some analytics content, creation is not a one-time task. Instead, the analytics content can undergo continuous or periodic development.

So-called hotfix processes are automatically executed to update the analytics content in respective tenants. By way of non-limiting example, a dashboard can be considered. An initial release of the dashboard can be provided as analytics content. However, the development team that provided the dashboard can revise (update) the dashboard. The updated dashboard can be released to the ACN 302 as analytics content, and the ACN 302 can distribute the updated dashboard to appropriate customers (e.g., all customers, if the dashboard is public; select customers, if the dashboard is restricted).

In some implementations, the APIs 308 include an export API and an import API that can be called based on uniform resource locators (URLs) of respective analytics system tenants (e.g., https://<AS_tenant URL>/api/v1/content/jobs) and which respectively enable for export/import of content packages. In some examples, import refers to downloading content from the ACN to an analytics system tenant, and export refers to uploading content to the ACN from an analytics system tenant. In some examples, the export API accepts a list of content items as input and can collect any dependent data objects to create a content package. By way of non-limiting example, in an api/v1/content/jobs endpoint, a type parameter is included and is set to EXPORT or IMPORT. During an export API call, identifiers assigned to respective content (e.g., stories, models) present in the current tenant (source tenant) are set to be exported. All of the content specified, and any dependencies, are exported to the ACN as a new package in a background job. During an import call, the content present inside an ACN package is imported into the target tenant.

In some examples, each of the import API and the export API operates asynchronously. For example, a first call triggers import/export and a "job id" is returned, which can be used to poll for the status of the import/export job. After some time (e.g., seconds, minutes), the job is finished and the analytics content is imported/exported. In some examples, authentication is provided using authentication clients. For example, the open authentication (OAuth) protocol can be used for the authentication process. In some examples, authentication is performed using OAuth clients and a client credentials flow. In some examples, OAuth clients are created locally to a tenant (e.g., as part of the configuration of the tenant using the TC-API, described above). Consequently, these APIs are typically called from an application tenant, which can connect to its associated analytics system tenant.

Recently, SAC has become embedded into more and more SAP Line of Business (LoB) products. Moreover, the transport of content is becoming embedded into LoB processes and procedures as well.

Under some circumstances, a LoB customer may desire to use ACN to share content between their tenants, but not via a tenant URL. Instead, the customer may want to share content stored in ACN (Cloud storage), via a file-based mechanism. Such file-based sharing may not be limited to tenants in a single region (or landscape), but also across regions and across landscapes.

Accordingly, embodiments allow content stored in a cloud storage to be shared to other tenants using files. As mentioned above, this is due to SAC being embedded into LoBs to function as SAP's offering for analytical tool and user experience.

Such embedding can include UI integration, where the SAC UI would be embedded in LoB's UI. Such embedding can also include API integration, where Public APIs exposed by SAC would be called by LoBs from their internal UI. For ACN workflows, Public APIs exposed by ACN are used by LoBs.

Details of a workflow sequence according to an example, are now described. LoBs would have a different listing page, where all analytic content developed for their customers would be listed.

A customer can modify a particular report to fit their requirements. Then, a next step would be to share this content to other tenants. A conventional ACN workflow would be to give particular tenant URLs of other tenants which would need to access the content.

Figure 4:
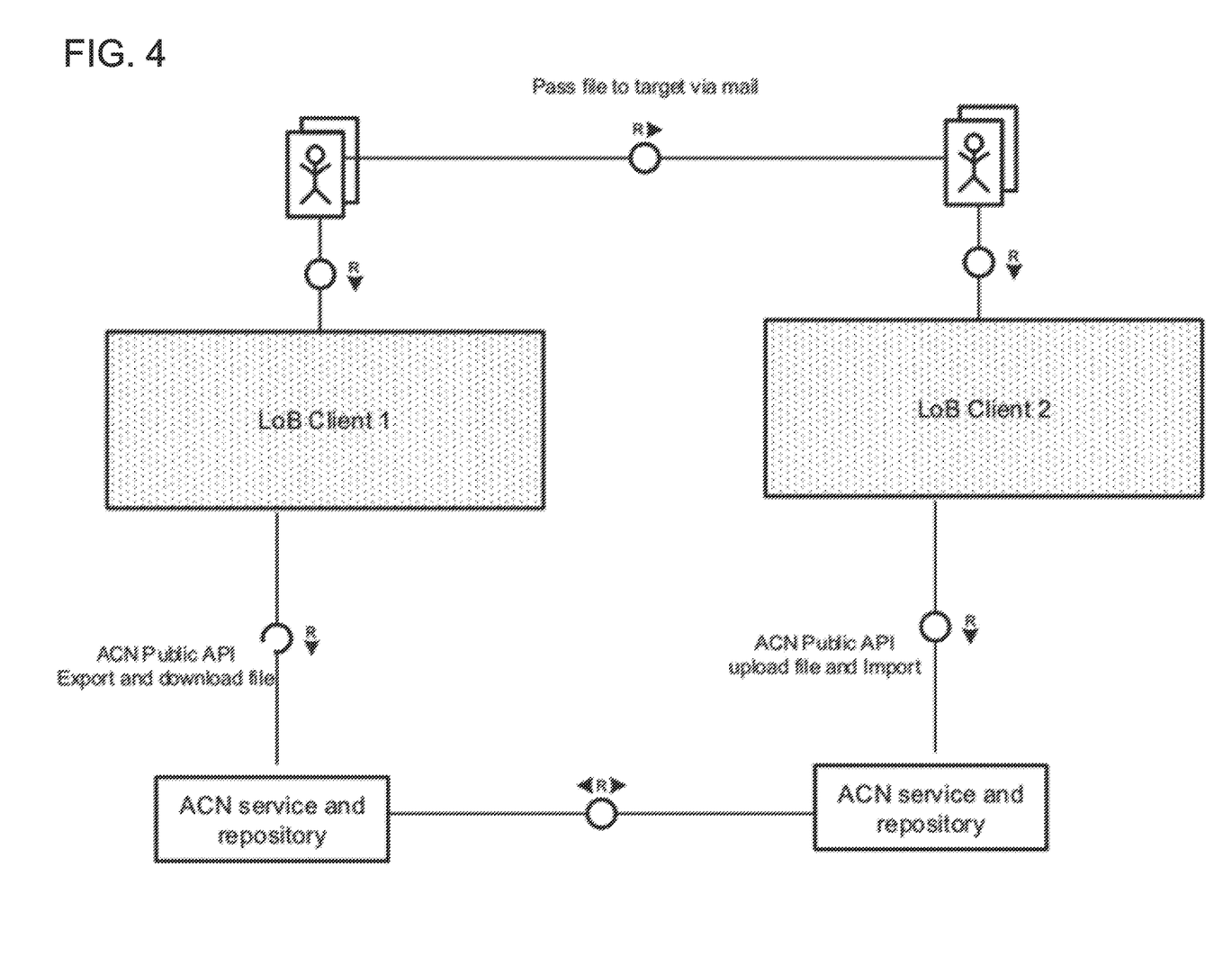
FIG. 4 shows a simplified flow diagram of a method according to an example.

However, in order to avoid issues arising from tenant URL sharing, embodiments according to this example offer a mechanism to distribute SAC content in ACN, but without providing a target tenant URL. FIG. 4 is a simplified diagram illustrating the sharing of content between two LoB clients according to an example.

In particular, rather than sharing the tenant URL, a small file is downloaded by the report creator. That small file contains metadata, but no content data.

That small file is shared with others via an available communication channel other than ACN itself. Here, the exemplary communication channel is shown as email, but it could also be shared folder, text, physical transport, or others.

The consumer of the report can be located on any region or landscape. That consumer would upload this small file to ACN via the analytic content display page of LoB.

The small file would have enough information to allow checking for integrity of the file. The small file would also allow importing the data content from the ACN package into the target tenant.

A corresponding workflow according to this example, is now given. First, a content creator creates stories in SAC, and saves in the respective LoB listing page. An option to download this store to share with another client, would be offered.

Next, when download is clicked, LoB would call multiple ACN Public APIs.

a. An Export Job API with Story ID is created. This would export a given story from SAC tenant used by LoB into ACN.

b. A Job Status API is obtained. Since export job is a background task, LoB pings ACN service to verify if the job is completed and successful.

c. A Download File API is utilized. For the exported package, a stream of bytes is provided which is then downloaded into a file. This file contains an encrypted stream of bytes containing metadata such as Package Id (of the content to be shared), and source landscape (the landscape in which the package has been created).

This downloaded file can now be shared with target tenant(s) who seek to consume this content.

In particular the consumer would then upload this file via the analytics page of the LoB. Here, LoB calls follow ACN APIs. These calls include:

a. Import from file API—triggers an import Job using details provided in the file. The file gets decrypted on ACN to ensure integrity of the file b. Get Job Status API—check the status of import job and update user once complete Once the import is complete, the content consumer would see the story in their listing page. They can consume and modify the story based on their authorizations (e.g., according to various levels of defined access rights).

Further details regarding implementation of this example, are now described. The basic export and import functionality is provided by ACN. In particular, ACN acts as:

1) storage for storing metadata and data as a package in the cloud; and 2) permission and authorization check to allow content to be imported by authorized users.

Using just a small file to share content from a creator to a consuming tenant, would ensure that tenant URL is not required to grant access. And, having the small file include only metadata helps to prevent a malicious party from hacking the content transport or changing the content data.

To ensure integrity of the file in this example, the following mechanism of encryption and decryption is followed.

1. A secret key is created and stored in a vault. The vault is a mechanism which is available to share secret information among our services running on all landscapes. The secret key is created for the AES algorithm and is stored in a specific path which only our service is aware of and has access to.

a. secret/sap/orca/analytic-content-network/encrypt_key/cf/
b. secret/sap/orca/analytic-content-network/encrypt_key/neo/

2. On the source tenant, the following actions are performed.

a. The source JSON string is created, which contains package Id and landscape name.
b. The secret key is read from the vault.
c. A new Initialization Vector (nonce) is generated for using in GCM parameters. A new random nonce may be used for every encryption
d. This secret key and the nonce are used to encrypt the string.
e. Additional bytes containing the nonce are added to the encrypted string (for use during decryption).
f. The encrypted string is generated every time, and is not stored. It may be Base64 encoded and sent.

3. On the target tenant, the following actions are performed.

a. The encrypted string is received.
b. The encrypted string is decoded and the bytes obtained.
c. The encrypted content and nonce are split.
d. The secret key is read from the vault.
e. The message is decrypted using the secret key and nonce parameter.
f. If there is any failure with decryption, a generic error message response is given.

4. The handling of key rotation is accomplished as follows. Key rotation is required from a security perspective, in order to ensure that no hacker would be able to decrypt our package, even if they somehow obtain our secret key. This secret key would be changed on a regular basis.

a. Every quarter we create a key in vault and move existing key to a new path key_old
b. Any new export would use the new key
c. Since we need to support import of package created in previous QRC, would try decrypting with new and old key.
d. in this manner, key would be rotated every quarter.

Returning now to FIG. 1, there the particular embodiment is depicted with the engine responsible for file-based content sharing as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 5:
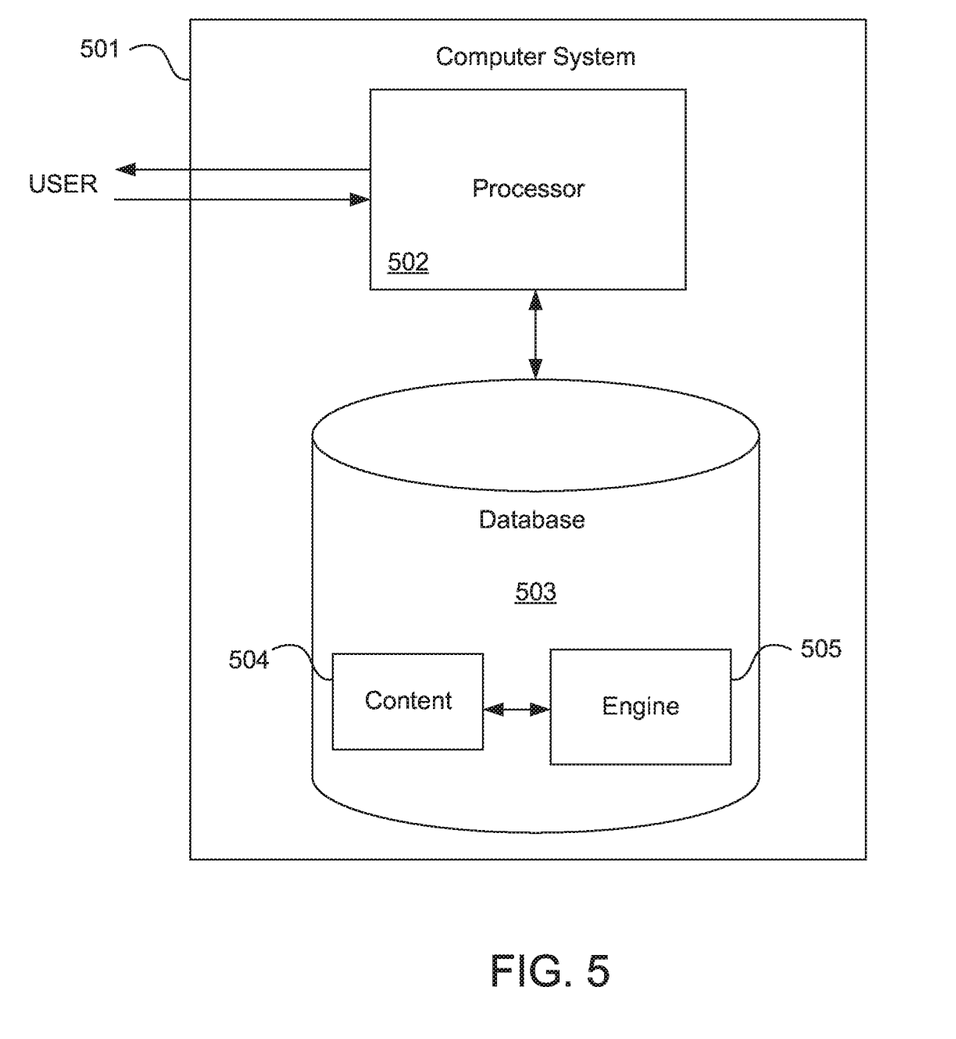
FIG. 5 illustrates hardware of a special purpose computing machine according to an embodiment that is configured to implement file-based content sharing.

Thus FIG. 5 illustrates hardware of a special purpose computing machine configured to implement content sharing according to an embodiment. In particular, computer system 501 comprises a processor 502 that is in electronic communication with a non-transitory computer-readable storage medium comprising a database 503. This computer-readable storage medium has stored thereon code corresponding to an engine 505. Code 504 corresponds to content including content data and content metadata. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Embodiments as described herein may offer certain benefits over other approaches. One possible benefit is increased efficiency in sharing content that may be useful to multiple entities. In particular, embodiments promote the reuse of analytic solutions in different LoBs, with consistent functionalities being available across different landscapes.

Other possible benefits attributable to the implementation of various embodiments, may derive from increased security. For example, the Delivery Unit (DU) is a general format supported by HANA. The downloaded (.tgz) file can be modified before uploading to SAC.

However, the support of DUs may pose security concerns as a form of transporting content with Export/Import. This is because DU utilizes a file format where content is also part of the downloaded file.

By contrast, as described above, particular embodiments may avoid this issue. In particular, embodiments may ensure high security by the reliance upon strict encryption mechanisms. Moreover, as described above, according to embodiments the content can be stored in ACN (which is a cloud storage), but only metadata about this content package may be downloaded and shared (rather than the actual content itself).

It is further noted that the downloading and uploading of large files (e.g., containing many stories and their dependencies) may offer performance bottlenecks. This can be mitigated by embodiments utilizing chunking and backend actions performed in ACN.

Figure 6:
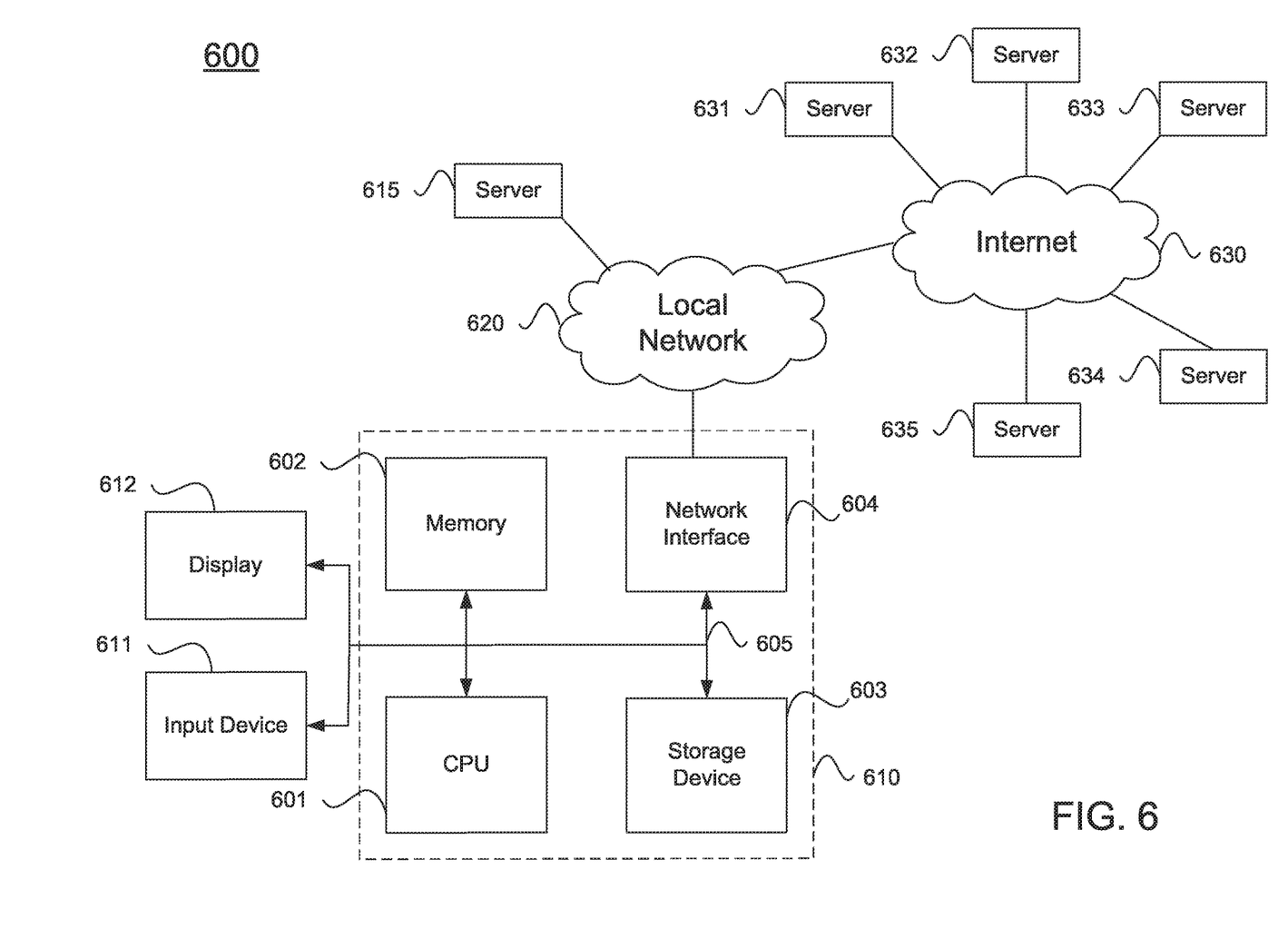
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
storing a content file in a database, said content file comprising content data and content metadata;
receiving from a source, a request to distribute the content data stored in the database of a distribution network to a target consumer, the request not including Uniform Resource Locator (URL) information of the target consumer;
based upon the request, referencing the content metadata stored in the database with the content data, to generate a metadata file including file metadata comprising a portion of the content metadata of the content file, wherein the metadata file does not contain the content data;
exporting the metadata file to the source;
importing the metadata file from the target consumer;
processing the file metadata to examine an integrity of the content file on the distribution network; and
upon determining the integrity of the content file, distributing and sharing the content data and the content metadata of the content file to the target consumer from the distribution network.

2. The method as in claim 1 wherein:
the content file is created for a customer; and
the target consumer comprises a first tenant of the customer.

3. The method as in claim 2 wherein the source comprises a second tenant of the customer.

4. The method as in claim 1 wherein:
the content file comprises a package;
the content metadata comprises an identifier of the package; and
the file metadata includes the identifier of the package.

5. The method as in claim 1 wherein:
the target consumer resides within a landscape;
the content metadata comprises an identifier of the landscape; and
the file metadata includes the identifier of the landscape.

6. The method as in claim 5 wherein:
the source comprises a first tenant of a customer;
the target consumer comprises a second tenant of the customer; and
the landscape comprises a customer landscape.

7. The method as in claim 1 wherein:
the file metadata comprises a key, said key being stored in a vault; and
the key is referenced to examine the integrity of the content file.

8. The method as in claim 1 wherein:
the database of the distribution network comprises an in-memory database; and
the processing is performed by an in-memory database engine of the in-memory database.

9. The method as in claim 1 wherein the content file is delivered by the source to the target consumer along a communication channel outside of the distribution network.

10. A non-transitory computer readable storage medium embodying a computer program for performing a method, said method comprising:
storing a content file in a database, said content file comprising content data and content metadata;
receiving from a source, a request to distribute the content data stored in the database of a distribution network to a first customer tenant residing within a customer landscape, the request not including Uniform Resource Locator (URL) information of the first customer tenant;
based upon the request, referencing the content metadata stored in the database with the content data, to generate a metadata file including file metadata comprising an identifier of the customer landscape, wherein the metadata file does not contain the content data;
exporting the metadata file to the source;
importing the metadata file from the first customer tenant;
processing the file metadata to examine an integrity of the content file on the distribution network; and
upon determining the integrity of the content file, distributing and sharing the content data and the content metadata of the content file to the first customer tenant from the distribution network.

11. The non-transitory computer readable storage medium as in claim 10 wherein the source comprises a customer for whom the content file was created.

12. The non-transitory computer readable storage medium as in claim 10 wherein the source comprises a second customer tenant also residing with the customer landscape.

13. The non-transitory computer readable storage medium as in claim 10 wherein:
the content file comprises a package;
the content metadata comprises an identifier of the package; and
the file metadata further includes the identifier of the package.

14. The non-transitory computer readable storage medium as in claim 10 wherein:
the file metadata further comprises a key stored in a vault; and
the key is referenced to examine the integrity of the content file.

15. A computer system comprising:
one or more processors;
a software program, executable on said computer system, the software program configured to cause an in-memory database engine of an in-memory database to:
store a content file comprising content data and associated content metadata in a content distribution network;
receive from a source, a request to distribute the content data to a target consumer, the request not including Uniform Resource Locator (URL) information of the target consumer;
based upon the request, referencing the content metadata to generate a metadata file including file metadata comprising a portion of the content metadata, wherein the metadata file does not contain the content data;
export the metadata file to the source;
import the metadata file from the target consumer;
process the file metadata to examine an integrity of the content file on the content distribution network; and
upon determining the integrity of the content file, distribute and share the content data and the content metadata of the content file to the target consumer from the content distribution network.

16. The computer system as in claim 15 wherein:
the content file is created for a customer;
the target consumer comprises a first tenant of the customer residing within a customer landscape; and
the content metadata comprises an identifier of the customer landscape.

17. The computer system as in claim 16 wherein the source comprises the customer or a second tenant of the customer also residing within the customer landscape.

18. The computer system as in claim 15 wherein:
the file metadata further comprises a key stored in a vault; and
the key is referenced to examine the integrity of the content file.

19. The computer system as in claim 15 wherein:
the content file comprises a package;
the content metadata comprises an identifier of the package; and
the file metadata includes the identifier of the package.

20. The computer system as in claim 15 wherein the content file is delivered by the source to the target consumer along a communication channel outside of the content distribution network.

* * * * *